United States Patent
Baltaxe et al.

(10) Patent No.: US 12,291,232 B2
(45) Date of Patent: May 6, 2025

(54) AUTOMATED DETECTION OF SPECULAR REFLECTING ROAD SURFACES USING POLARIMETRIC IMAGE DATA

(71) Applicant: GM GLOBAL TECHNOLOGY OPERATIONS LLC, Detroit, MI (US)

(72) Inventors: Michael Baltaxe, Kfar Saba (IL); Tzvi Philipp, Bet Shemesh (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 298 days.

(21) Appl. No.: 18/178,748

(22) Filed: Mar. 6, 2023

(65) Prior Publication Data
US 2024/0300518 A1 Sep. 12, 2024

(51) Int. Cl.
| | |
|---|---|
| *G01N 21/55* | (2014.01) |
| *B60K 35/00* | (2006.01) |
| *B60W 60/00* | (2020.01) |
| *G01N 21/47* | (2006.01) |
| *G05B 23/02* | (2006.01) |
| *G06V 20/56* | (2022.01) |

(Continued)

(52) U.S. Cl.
CPC ........... *B60W 60/001* (2020.02); *B60K 35/00* (2013.01); *G06V 20/588* (2022.01); *B60K 35/23* (2024.01); *B60K 35/28* (2024.01); *B60K 2360/175* (2024.01)

(58) Field of Classification Search
CPC ..... B60W 60/001; B60K 35/00; B60K 35/23; B60K 35/28; B60K 2360/175; G06V 20/588; G01N 21/55; G01N 21/47; G05B 23/0221
See application file for complete search history.

(56) References Cited

U.S. PATENT DOCUMENTS

| | | | |
|---|---|---|---|
| 10,641,897 B1 * | 5/2020 | Dussan | G01S 17/42 |
| 12,061,091 B2 * | 8/2024 | Dittmer | G05D 1/0246 |

(Continued)

FOREIGN PATENT DOCUMENTS

| | | | | |
|---|---|---|---|---|
| CN | 112954281 A * | 6/2021 | ......... | G01S 13/9076 |
| DE | 102018205964 A1 | 10/2018 | | |

(Continued)

*Primary Examiner* — Rachid Bendidi
*Assistant Examiner* — Joseph Anderson Yanoska
(74) *Attorney, Agent, or Firm* — Quinn IP Law

(57) ABSTRACT

A detection system for a host vehicle includes a camera, global positioning system ("GPS") receiver, compass, and electronic control unit ("ECU"). The camera collects polarimetric image data forming an imaged drive scene inclusive of a road surface illuminated by the Sun. The GPS receiver outputs a present location of the vehicle as a date-and-time-stamped coordinate set. The compass provides a directional heading of the vehicle. The ECU determines the Sun's location relative to the vehicle and camera using an input data set, including the present location and directional heading. The ECU also detects a specular reflecting area or areas on the road surface using the polarimetric image data and Sun's location, with the specular reflecting area(s) forming an output data set. The ECU then executes a control action aboard the host vehicle in response to the output data set.

20 Claims, 5 Drawing Sheets

(51) Int. Cl.
*B60K 35/23* (2024.01)
*B60K 35/28* (2024.01)

(56) References Cited

U.S. PATENT DOCUMENTS

| | | | |
|---|---|---|---|
| 2016/0046290 A1* | 2/2016 | Aharony | B60W 10/20 |
| | | | 701/41 |
| 2018/0005012 A1 | 1/2018 | Aycock et al. | |
| 2021/0264169 A1 | 8/2021 | Speigle et al. | |

FOREIGN PATENT DOCUMENTS

| | | | |
|---|---|---|---|
| DE | 102020129096 A1 | | 6/2021 |
| DE | 112020004884 T5 | | 7/2022 |
| KR | 20130040964 A | * | 4/2013 |

* cited by examiner

AUTOMATED DETECTION OF SPECULAR REFLECTING ROAD SURFACES USING POLARIMETRIC IMAGE DATA

INTRODUCTION

Autonomously-controlled vehicles rely on computer vision capabilities, with such capabilities developed using machine learning techniques. For example, a controller of an autonomous motor vehicle may use camera-based computer vision systems to accurately estimate the presence of a drivable road surface within surrounding drive environs. Using onboard sensors, the controller is able to estimate the location of the road surface in collected image pixels of a drive scene and use the estimated location to plan drive routes, and detect vehicles, pedestrians, curbs, sidewalks, trees, buildings, and other potential obstacles. Additionally, the controller may consider coatings or substances on the road surface, e.g., painted surfaces, water, ice, or oil, as additional perception information. The controller uses the collective set of perception information to control an autonomous drive event.

Image data collected by the onboard sensors includes pixel data corresponding to the drivable surface area or "free space". Free space in a given set of image data is typically estimated as a binary segmentation of the collected image, with one or more image segmentation techniques being performed to separate the drivable surface area from corresponding surface areas of non-drivable surfaces. The use of color video alone for the purpose of detecting free space and identifying items of interest on the road surface itself is currently suboptimal, which may adversely affect performance of onboard perception functions and resulting path planning operations.

SUMMARY

The technical solutions described herein are collectively directed toward improving the overall drive experience of a host vehicle using polarimetric data. More specifically, the present disclosure pertains to the detection of specular reflecting areas on a road surface within an imaged drive scene, with the constituent image data including polarimetric image data as set forth herein. As appreciated in the art, paved and unpaved road surfaces such as concrete, asphalt, gravel, and dirt are generally non-reflective. However, substances or coatings on the road surface could be reflective. Representative examples of reflective substances include water, oil, and ice. Additionally, crosswalks and school crossings are frequently demarcated with reflective paint. Reflective surfaces are thus identified and treated as "items of interest" within the scope of the present disclosure, with accurate detection of reflective surfaces being usable as part of a path planning strategy and/or to inform other systems aboard the host vehicle.

In particular, an aspect of the disclosure includes an automated detection system for use aboard a host vehicle. The system as contemplated herein includes a camera, a Global Positioning System ("GPS") receiver, a compass, and an electronic control unit ("ECU"). The camera collects polarimetric image data of an imaged drive scene, which in turn is inclusive of a road surface illuminated by the Sun. The GPS receiver is operable for outputting a present location of the host vehicle, e.g., as a date and time-stamped coordinate set. The compass for its part provides a directional heading of the host vehicle.

The ECU, which is in communication with the camera, the GPS receiver, and the compass, is configured to determine the Sun's location relative to the host vehicle. This action occurs using an input data set including the present location and the directional heading. The ECU detects one or more specular reflecting areas on a road surface within the imaged drive scene using the polarimetric image data and the Sun's location. The specular reflecting areas form an output data set, in response to which the ECU executes a control action aboard the host vehicle.

The ECU in one or more representative embodiments measures an angle of linear polarization ("measured AoLP") using the polarimetric camera. The ECU then estimates an angle of linear polarization ("estimated AoLP") using the Sun's location and the 3D location of the image pixel, assuming that the imaged object is on the road surface, and calculates a "delta value" as a difference between the estimated and measured AoLP, and ultimately detects the one or more specular reflecting areas on the road surface using this delta value.

The ECU may selectively apply a light reflecting and scattering model, e.g., a bidirectional reflectance distribution function ("BRDF"), that assumes the dominant light source is located along a straight line extending from the imaged pixel and crossing the camera's focal point. The ECU in such an implementation then recalculates the above-noted delta value using the lighting model. When the recalculated delta value is close to zero, i.e., below the threshold (T) described below, the ECU confirms that the image pixel corresponds to the specular reflecting areas in the imaged drive scene.

The host vehicle in one or more embodiments may be constructed as a motor vehicle having a vehicle body, with the camera being connected to the vehicle body. For instance, the camera may include a red-green-blue ("RGB")-polarimetric camera or a monochromatic-polarimetric camera.

Another aspect of the disclosure includes the ECU being in communication with a path planning control module of the host vehicle. The ECU configured to provide the output data set to the path planning control module as at least part of the control action. The ECU may be placed in communication with a display screen and/or a heads-up display ("HUD") and configured to display a graphical representation of the imaged drive scene on the display screen and/or the HUD as at least part of the control action.

A method is also disclosed herein for use aboard a host vehicle. An embodiment of the method includes receiving, via an ECU of the host vehicle, an input data set from a camera, a GPS receiver, and a compass. The input data set includes polarimetric image data from the camera, a present location of the host vehicle from the GPS receiver, and a directional heading of the host vehicle from the compass. The polarized image data forms an imaged drive scene inclusive of a road surface, with the road surface in turn being illuminated by the Sun. The present location of the host vehicle includes a date-and-time-stamped coordinate set from the GPS receiver.

The method also includes determining the Sun's location relative to the host vehicle using the input data set, and also detecting a specular reflecting area on the road surface within the imaged drive scene using the polarimetric image data and the Sun's location. These actions occur via the ECU. The specular reflecting area forms an output data set. The method additionally includes executing a control action aboard the host vehicle via the ECU in response to the output data set.

In still other aspects of the disclosure, a motor vehicle is set forth herein having a vehicle body, road wheels connected to the vehicle body, and the system summarized above. An embodiment of the system as used with the motor vehicle includes a camera, GPS receiver, compass, and ECU. The camera collects polarimetric image data forming an imaged drive scene inclusive of a road surface illuminated by the Sun. The receiver is operable for outputting a present location of the host vehicle as a date and time-stamped coordinate set. The compass for its part provides a directional heading of the host vehicle.

The ECU in this particular embodiment is configured to determine the Sun location relative to the host vehicle using an input data set, with the input data set including the above-noted present location and directional heading from the GPS receiver and the compass, respectively. The ECU is also configured to detect a specular reflecting area on the road surface within the imaged drive scene using the polarimetric image data and the Sun location. The specular reflecting area forms an output data set. The ECU executes a control action aboard the motor vehicle in response to the output data set.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Components of the disclosed embodiments may be arranged in a variety of configurations. The following detailed description is therefore not intended to limit the scope of the disclosure as claimed, but rather is representative of possible embodiments thereof. In addition, while numerous specific details are set forth in the following description to provide a thorough understanding of various representative embodiments, embodiments may be capable of being practiced without some of the disclosed details. Moreover, in order to improve clarity, certain technical material understood in the related art has not been described in detail. Furthermore, the disclosure as illustrated and described herein may be practiced in the absence of an element that is not specifically disclosed herein.

The present automated solutions use polarimetric image data, the Sun's location relative to a camera of a host vehicle, and other information to improve upon the current state of the art in the realm of machine-based perception. The disclosed hardware and associated software implementations improve such perception accuracy by detecting specular reflecting areas in an imaged drive scene, with an electronic control unit ("ECU") 50 doing so aboard a host vehicle 10H such as the illustrated motor vehicle 10 shown in FIG. 1. Specular road surfaces tend to be smoother than bare or exposed pavement. The ECU 50, by detecting specular reflecting areas on a road surface 11, is therefore able to infer the presence of, e.g., painted lane markings, arrows, pedestrian crossings, oil, water, ice, or other specular reflecting substances or materials.

Figure 1:
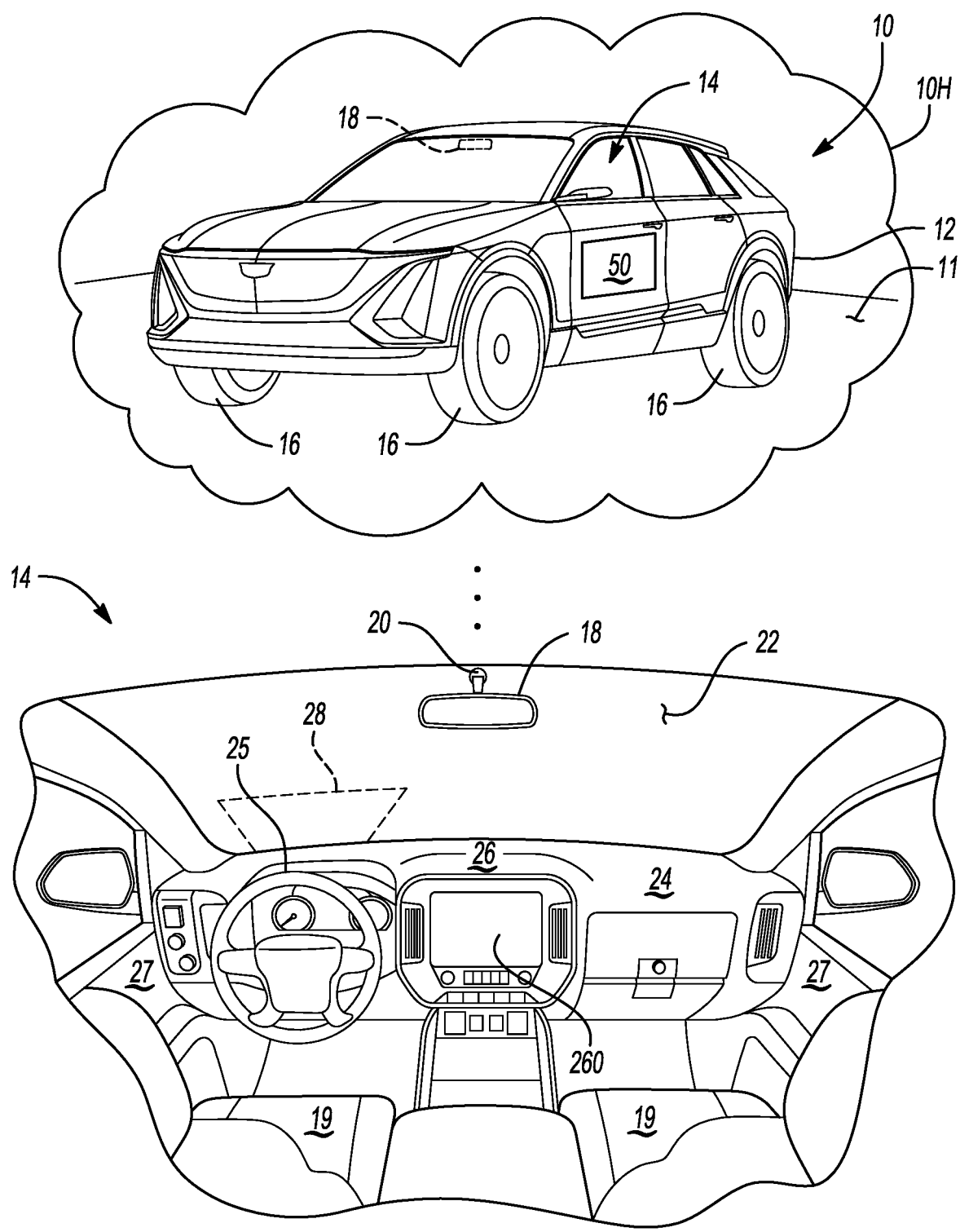
FIG. 1 is an illustration of a host vehicle equipped with a system for detecting a specular reflecting road surface area from polarimetric image data and other information in accordance with the present disclosure.

A representative use case as used throughout the following disclosure is that of the motor vehicle 10 of FIG. 1 as the motor vehicle 10 travels on the road surface 11. e.g., a paved or unpaved highway, lane, or surface street. The road surface 11 in turn is at least partially surrounded or bordered by non-drivable surfaces such as walls, curbs, and sidewalks 110 or forested or landscaped areas 111 (see FIG. 3). The technical solutions set forth in detail herein with particular reference to FIGS. 2-6 ultimately relate to estimating specular reflecting areas on the road surface 11 of FIG. 1 and its surrounding non-drivable environs. The improved perception accuracy provided by the present application is usable in a wide variety of mobile applications, such as but not limited to automated path planning, autonomous drive decision making, improved vehicle-to-occupant communication, etc.

The representative host vehicle 10H shown in FIG. 1 is described herein as being embodied as the motor vehicle 10, e.g., a passenger vehicle as shown. However, the present teachings may be applied in other mobile systems having a ground-based drive path that is not predefined or restricted, e.g., by rails, tracks, or the like. For example, the solutions described in detail below may be used with wheeled or tracked transport vehicles, farm equipment, trucks, delivery vehicles, mobile platforms, etc. Solely for illustrative consistency, the host vehicle 10H of FIG. 1 will be described hereinafter as the motor vehicle 10 having a vehicle body 12 defining a vehicle interior 14 without limiting the disclosure to such an embodiment.

The ECU 50 shown schematically in FIG. 1 is configured via software programming and the use of suitable hardware to analyze the surrounding drive environs of the motor vehicle 10. As used herein, "drive environs" refers to a potential/candidate set of drivable surface areas in an imaged drive scene for consideration by the ECU 50 or other systems when planning a drive path and/or when communicating the drive path to one or more passengers (not shown) seated within the vehicle interior 14. More specifically, the ECU 50 is configured to identifying specular reflecting surfaces in the imaged drive scene, with an ultimate goal of improving the overall accuracy of drive path planning processes while reducing hardware costs associated with this important task.

Further with respect to the exemplary motor vehicle 10, the vehicle body 12 is connected to one or more road wheels 16, with a typical four wheel configuration shown in FIG. 1. At least one of the road wheels 16 is powered by torque from a powertrain system (not shown), e.g., an electric traction motor(s) and/or an internal combustion engine and associated torque transfer mechanisms, to provide drive torque to the road wheels 16 at levels sufficient for propulsion. Depending on the particular configuration of such a powertrain system, the motor vehicle 10 could be variously embodied as a battery electric vehicle, a hybrid electric vehicle, a plug-in hybrid electric vehicle, an extended-range electric vehicle, a fuel cell vehicle, a gasoline, diesel, or a compressed natural gas or biofuel-powered vehicle in different constructions. The vehicle body 12 for its part may vary with the configuration of the motor vehicle 10, for instance as a sedan, coupe, pickup truck, crossover, sport utility vehicle, or other body style.

The vehicle interior 14 for its part may be equipped with one or more rows of vehicle seats 19, with two such vehicle seats 19 illustrated in FIG. 1 adjacent driver and passenger doors 27 aft of a windshield 22 and an instrument panel 24. A rearview mirror assembly 18 may be mounted to the windshield 22, with one or more polarimetric cameras 20 connected to the windshield 22, the rearview mirror assembly 18, and/or other suitable surfaces of the motor vehicle 10 in different embodiments. In other words, the camera 20 in some embodiments may be a body-mounted camera 20, which in turn could communicate the polarimetric image data 23 over a vehicle communication network. The vehicle interior 14 of FIG. 1 is also equipped with various driver input devices, such as a steering wheel 25 and brake and accelerator pedals (not shown), etc. For the purpose of facilitating interaction between the ECU 50 and occupants of the motor vehicle 10, the instrument panel 24 may be equipped with a center stack 26 having an infotainment display screen 260.

In one or more embodiments, the motor vehicle 10 could also be equipped with a heads-up display ("HUD") 28. The HUD 28 is configured and positioned for projecting information onto the windshield 22 as shown, or onto a separate HUD display (not shown) situated on or adjacent to the instrument panel 24. The windshield 22 (and thus the camera 20) are connected or mounted to the vehicle body 12. Either or both of the HUD 28 and the display screen 260 may be controlled via the display control signal (CCD) to display a graphical representation of the estimated specular reflecting area, e.g., as a color view of the imaged drive scene ahead of the motor vehicle 10, with identified specular reflecting area in the drive scene incorporated into the drive path planning function of the ECU 50 or a separate path planning control module ("PPM") 62 as illustrated in FIG. 2.

Figure 2:
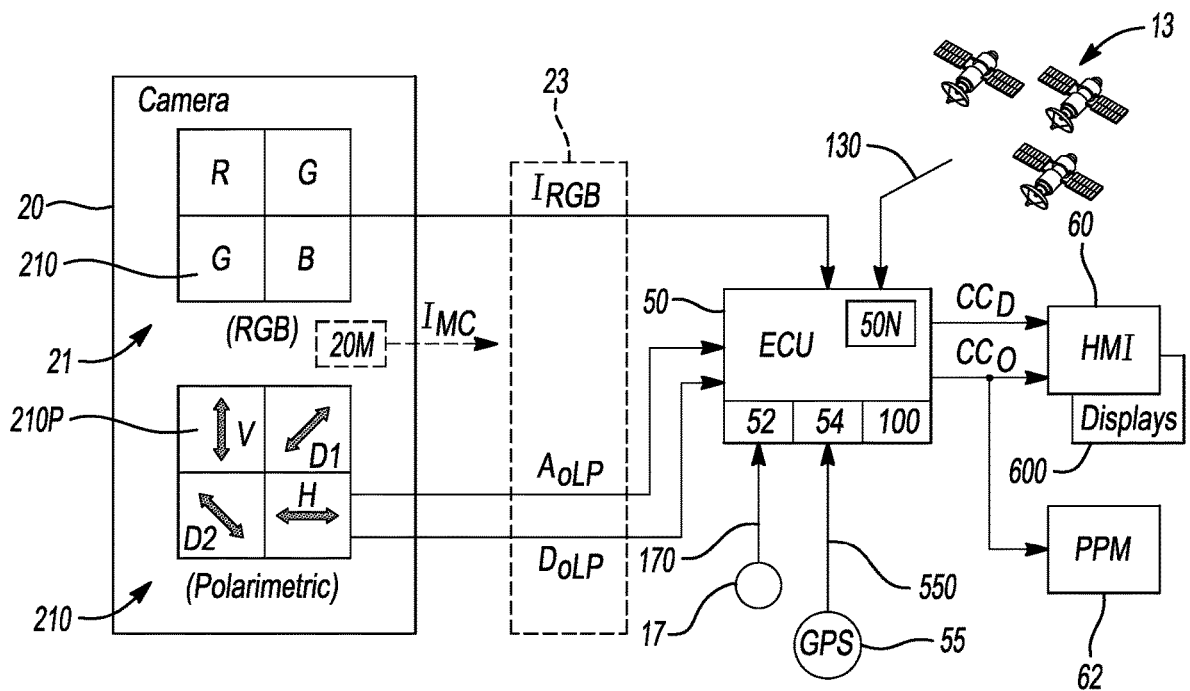
FIG. 2 is a flow diagram describing an embodiment of a system for use with the host vehicle of FIG. 1.

Referring to FIG. 2, the ECU 50 relies on the availability and use of polarimetric image data 23 from the polarimetric camera(s) 20 for the purpose of identifying specular reflecting surface area on the road surface 11 of FIG. 1 within an imaged drive scene. As appreciated by those skilled in the art, polarimetric image data is available through the use of specialized multi-modal sensors of the camera 20 that are operable for collecting not only polarization state information, but also data from a particular band of the electromagnetic spectrum. FIG. 2 illustrates one such exemplary case in the form of non-limiting red-green-blue ("RGB") image data (IRGB), while in an alternative possibility the polarimetric image data 23 includes monochromatic image data (IMc) from a corresponding monochromatic image sensor 20M, such that the camera 20 provides monochromatic-polarimetric image data. Other color-polarimetric combinations could be used within the scope of the disclosure other than RGB-polarimetric. For instance, a different color filter array could be used to implement red-green-green-clear ("RGGC"), red-clear-clear-green ("RCCG"), or red-green-yellow-clear ("RGYC") as just a few alternative permutations.

The exemplary RGB-polarization capability of the camera 20 is represented in FIG. 2 as a color pixel block 21 constructed of red ("R"), green ("G"), and blue ("B") image pixels 210. Each image pixel 210 includes four or more constituent sub-pixels 210P, for a total of sixteen or more pixel calculation units as appreciated in the art. Arrow IRGB in FIG. 2 represents the additional RGB color information contained in the polarimetric image data 23 provided to the ECU 50, as noted above. Such polarization data is time-synchronized with the RGB or monochromatic data. In FIG. 2, for instance, the polarization data is represented as polarized pixel block 210 having four of sub-pixels 210P. Each of the sub-pixels 210P in turn has a corresponding polarity direction as indicated by polarization arrows V, D1, D2, and H representing vertical, first and second diagonal, and horizontal polarities, respectively. The polarimetric image data 23 communicated to the ECU 50 by the camera (s) 20 thus may include polarimetry data and RGB or monochromatic data, with the former being in the form of an angle of linear polarization ("AoLP") and a degree of polarization ("DoLP").

As will be appreciated by those of ordinary skill in the art, polarimetry pertains to the measurement and interpretation of a polarization state of transverse waves, such as the light waves considered in the present application. Polarimetry is often used to study properties of interest in different materials, as well as the presence or absence of certain substances therein. For instance, ambient sunlight falling incident upon the road surface 11 of FIG. 1 will reflect off of the road surface 11 to some extent. AoLP is the average polarization angle of the incident light from the Sun 15 (see FIG. 3) or another source at a given image pixel. DoLP in turn is the specific proportion of the incident light that is linearly polarized at a given image pixel. For a perfectly polarized light source, DoLP=1 (or 100%), while perfectly unpolarized light would have a corresponding DoLP of 0 (or 0%). As a representation of the polarimetric data, the ECU 50 may use the AoLP, which is in the range (0°-180°), and the DoLP with its range (0-1). The ECU 50 thus determines the polarization state of the reflected portion of the incident sunlight, normalizes this information using normalization control logic 50N via performance of the present method 100, and uses the normalized information to inform decisions and control actions aboard the motor vehicle 10 of FIG. 1.

For example, the ECU 50 shown in FIGS. 1 and 2 may use the polarization state to ascertain drive scene information, including the orientation and material properties of the road surface 11, the viewing direction of the camera 20, the illumination direction of incident sunlight, etc. The polarization state in turn may be measured by the camera 20 by passing reflected light through polarizing filters (not shown, but present on top of each of the sub-pixels 210P), and thereafter measuring light intensity as the light is transmitted from the polarizing filters. The amount of transmitted light depends on the angle between the polarizing filter and the oscillation plane of the electrical field of incident light, and thus can be measured and used by associated processing hardware of the camera(s) 20 to determine the polarization state. This state is then normalized via the normalization logic 50N.

In order to perform the disclosed estimation and perception functions to identify specular reflecting surfaces in the collected polarimetric image data 23 of FIG. 2, one or more processors 52 of the ECU 50 are configured to execute computer-readable instructions embodying the method 100. The instructions and corresponding method 100 may be implemented as control logic or computer-readable instructions from memory 54, with the memory 54 also being loaded with normalization logic 50N as described below with reference to FIGS. 3 and 4. The memory 54, which may include tangible, non-transitory computer-readable storage medium, e.g., magnetic media or optical media, CD-ROM, and/or solid-state/semiconductor memory, such as various types of RAM or ROM. The processor 52 could include, e.g., Application Specific Integrated Circuit(s) (ASICs), Field-Programmable Gate Arrays (FPGAs), electronic circuit(s), central processing unit(s), microprocessor(s), etc.

Various other hardware in communication with the ECU 50 may include, e.g., input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Non-transitory components of the memory 54 are capable of storing machine-readable instructions in the form of one or more software or firmware programs or routines, combinational logic circuit(s), input/output circuit(s) and devices, signal conditioning and buffer circuitry and other components that can be accessed by one or more processors 52 to provide a described functionality.

Within the scope of the present disclosure, and in order to detect the specular reflecting surfaces in the constituent pixels of the collected polarimetric image data 23, the ECU 50 is in communication with a global positioning system ("GPS") receiver 55, which in turn receives GPS signals 130 from an orbiting constellation of GPS satellites 13. The ECU 50 is thus apprised of the corresponding ground plane coordinates of the motor vehicle 10 depicted in FIG. 1. The ECU 50 is also in communication with a compass 17, which in turn provides directional heading signals 170 indicative of the current heading of the motor vehicle 10. When performing the method 100 using the normalization logic 50N, the ECU 50 therefore receives a set of inputs from the GPS receiver 55, the compass 17, and the camera(s) 20, and then normalizes the polarimetric portions of the polarization image data 23 as described below. For instance, a time-and-date-stamped vehicle location 550 is provided via the GPS receiver 55, while the directional heading 170 of the motor vehicle 10 is provided by the compass 17. Such information arrives in addition to the polarization image data 23 from the camera 20 as described above.

The ECU 50 also transmits output signals (CCo) as a control action, e.g., including a display control signal (CCD) to a human-machine interface ("HMI") 60 and/or to one or more display screens ("Displays") 600 connected thereto, and/or as inputs to the PPM 62. The display screen(s) 600 may include the HUD 28 or infotainment display screen 260 shown in FIG. 1. The PPM 62 for its part may be embodied as one or more processors or electronic control modules akin to the processor 52 or sharing processing capabilities thereof, with the PPM 62 being configured to auto-generate a driving path that the motor vehicle 10 will ultimately travel on during an autonomous or semi-autonomous drive event. Such a path utilizes identified free space to separate the road surface 11 from surrounding non-drivable surfaces and natural or manmade objects. Within this free space, the ECU 50 detects specular reflecting areas and thus objects or surfaces having different surface textures than the paved road surface 11. Performing such analysis using polarimetric image data 23 thus differs markedly from the use of shape and color in traditional vision systems by also considering physical properties of the specular surface, informed by the location of the Sun 15 (S) and other information.

Figure 3:
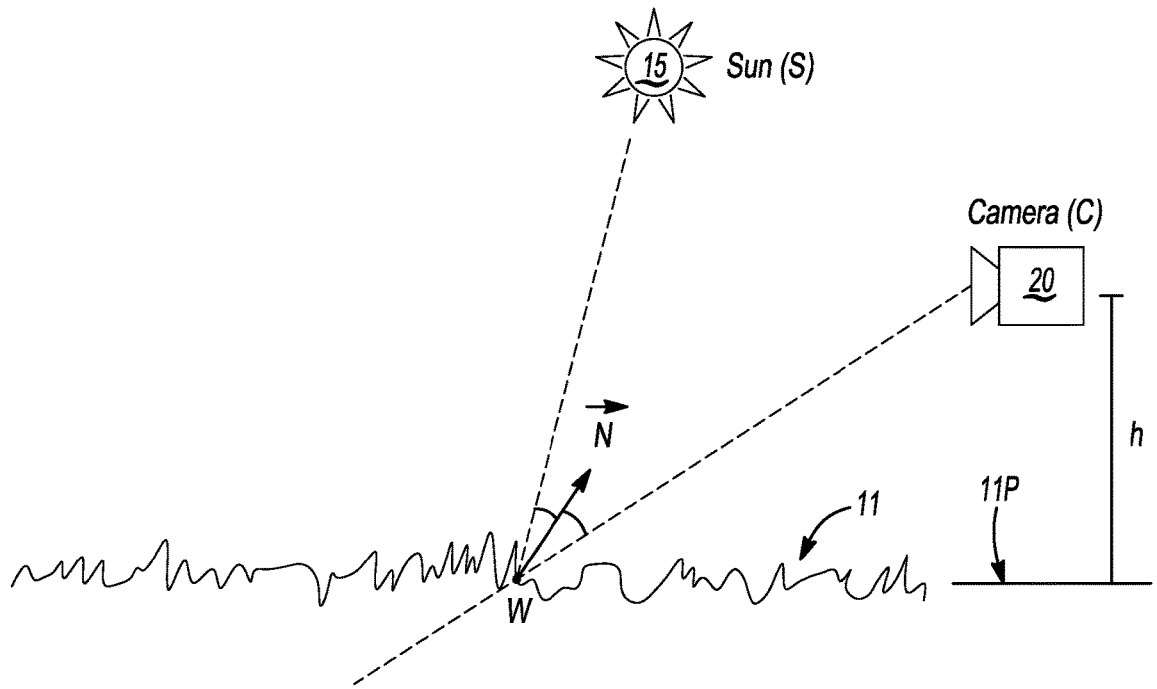
FIG. 3 illustrates a road surface and polarimetric camera relative to a position of the Sun.

Referring briefly to FIG. 3, the method 100 performed by the ECU 50 operates in part by finding the location (S) of the Sun 15 relative to the camera 20. A location (C) of the camera 20 is at a height (h) above the ground plane 11P. i.e., the road surface 11. In a representative driving scenario, an underlying assumption of the method 100 is that the relevant materials in an imaged drive scene scatter incident light in a specular direction relative to the surface normal. At a more granular level, the method 100 therefore uses this specular effect by determining the local surface normal (N) for each projected image pixel in the imaged scene.

On this small scale, the local surface normal (N) at a point (W) on the road surface 11 in the real world is defined by the location (S) of the Sun 15 and the location (C) of the camera 20 relative to point (W). In turn, the local surface normal (N) defines the relevant polarization parameters, AoLP and DoLP, at point W. Given the calibration parameters for the camera 20, indicated at (K) in FIG. 6 and described below, including at least the principal point and focal distance, the ECU 50 is able to obtain the 3D "real world" location of point W for each constituent pixel in the resulting images of the drive scene, assuming such images fall on the road surface 11 a distance away from the camera 20, with the camera 20 being at a height (h) above the road surface 11.

Figure 4:
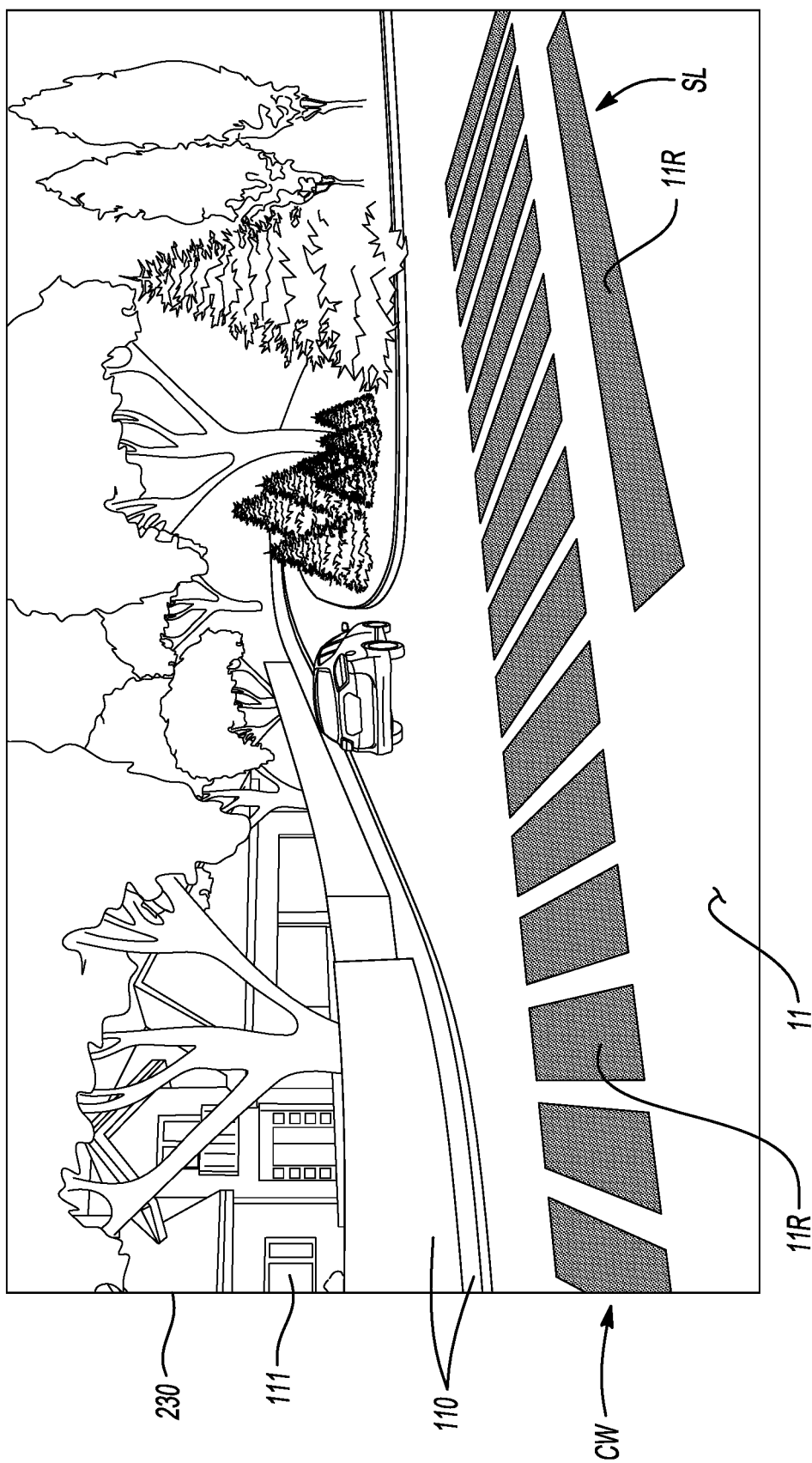
FIG. 4 is a representative imaged drive scene in which a road surface includes a specular reflecting surface in the form of an exemplary crosswalk.

Referring to FIG. 4, a representative imaged drive scene 230 includes the road surface 11 and non-drivable surfaces or objects such as the walls, curbs, and sidewalks 110, landscaped or inhabited areas 111, etc. The ECU 50, by executing instructions embodying the method 100, estimates which corresponding image pixels of the collected polarimetric image data 23 (FIG. 2) correspond to specular reflecting surfaces 11R, such as the illustrated crosswalk CW and stop line SL. As appreciated in the art, a bidirectional reflectance distribution function ("BRDF") is a function that models how light is reflected from surfaces having different roughness profiles. BRDF models may therefore be used to facilitate the present solutions.

Figure 5A:
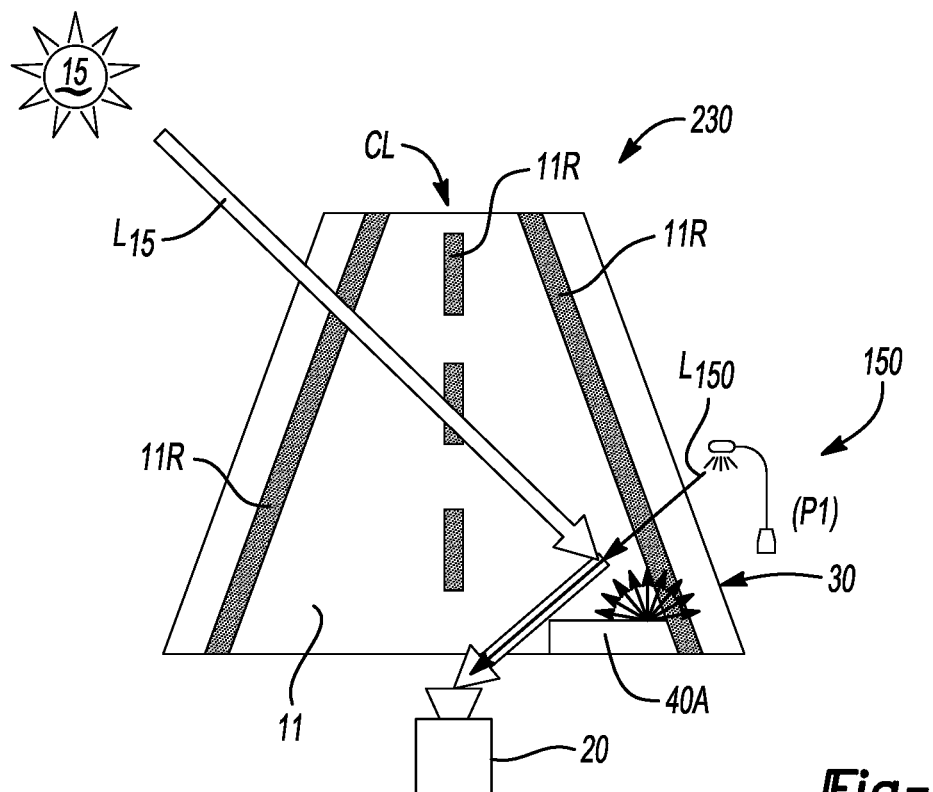
FIG. 5A illustrates a bi-directional reflectance distribution ("BRDF") model for a representative road surface, with the Sun being the dominant light source everywhere in the imaged drive scene.
Figure 5B:
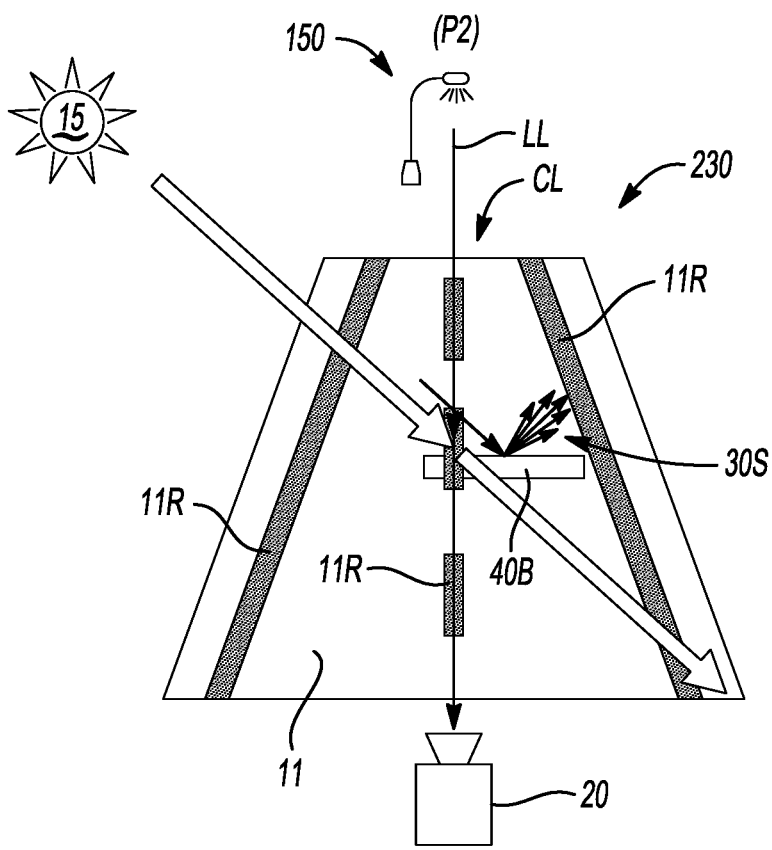
FIG. 5B illustrates a BRDF model for a specular element on the representative road surface of FIG. 5A, with the Sun being the dominant light source only at angles similar to the angle of incidence of incident light from the Sun.

Referring now to FIGS. 5A and 5B, a representative road BRDF is illustrated in FIG. 5A in which the Sun 15 remains the dominant light source for the pixels that capture the bare pavement of the road surface 11 in the imaged drive scene 230. A hypothetical light source 150 is represented at point P1, with incident light $L_{150}$ from light source 150 being overpowered by the incident sunlight Lis when the imaged location is the non-specular reflecting surface of the pavement. At this location light produces a reflectance pattern 30 having a more or less Gaussian distribution with a large standard deviation in the reflection angle. In other words, the incident sunlight $L_{15}$ and the incident light $L_{150}$ reflects in every direction at incident surface area 40A, more or less evenly, i.e., Lambertian scatter.

In contrast, as depicted in FIG. 5B, light is reflected with a specular and very directional BRDF on smooth road elements (e.g., painted lanes), such that the Sun 15 is the dominant light source only when imaged from angles similar to the angle of incidence of the light. The angle of incidence of light coming from the Sun 15 in turn is available to the ECU 50 via calculation using the location (S) of the Sun 15 (see FIG. 3). The light source 150 in FIG. 5B is now analyzed from point P2 which lies far away from the vehicle 10 along a straight line LL extending out of the imaged pixel and passing through the focal point of camera 20. In this case, the painting on the road surface 11 produces a more specular or directional reflectance pattern 30S at surface area 40B in comparison to the reflectance pattern 30 from surface area 40A of FIG. 5A, thus the light source 150 and not the Sun 15 will be the dominant light source, for the pixels for which line LL is away from the Sun's angle of incidence.

In practice, a measured AoLP is determined by the location of the dominant light source and the 3D location of the particular point (W) being imaged in relation to the location of the camera (C). By finding the location (S) of the Sun 15 and the 3D "real world" location of a given pixel, therefore, the ECU 50 is able to estimate AoLP. This assumes the pixels in the imaged drive scene 230 fall on the road surface 11, which in turn is assumed to be straight in the image. If the estimation fits the measurement, then the Sun 15 is the dominant light source, thus the imaged pixel is not a specular element (unless the Sun 15 happens to be located on line LL which happens with low probability). On the contrary, if the estimation is far from the measured AoLP, then either the estimated geometry or the location of the dominant light source is incorrect. The ECU 50 in this case may recalculate, assuming this time that the dominant light source is straight in front of the camera 20 along line LL (FIG. 5B). If the model fits, the ECU 50 registers the pixel as corresponding to a specular object on the road surface 11 and takes appropriate actions as needed. In other words, if the pixel is estimated as being a smooth surface, the pixel is taken into account as corresponding to, e.g., paint, water, oil, ice, or other attention-drawing element as noted above, with the rough surface is considered instead to correspond to the road surface 11, typically made of concrete, asphalt, gravel, or dirt.

Figure 6:
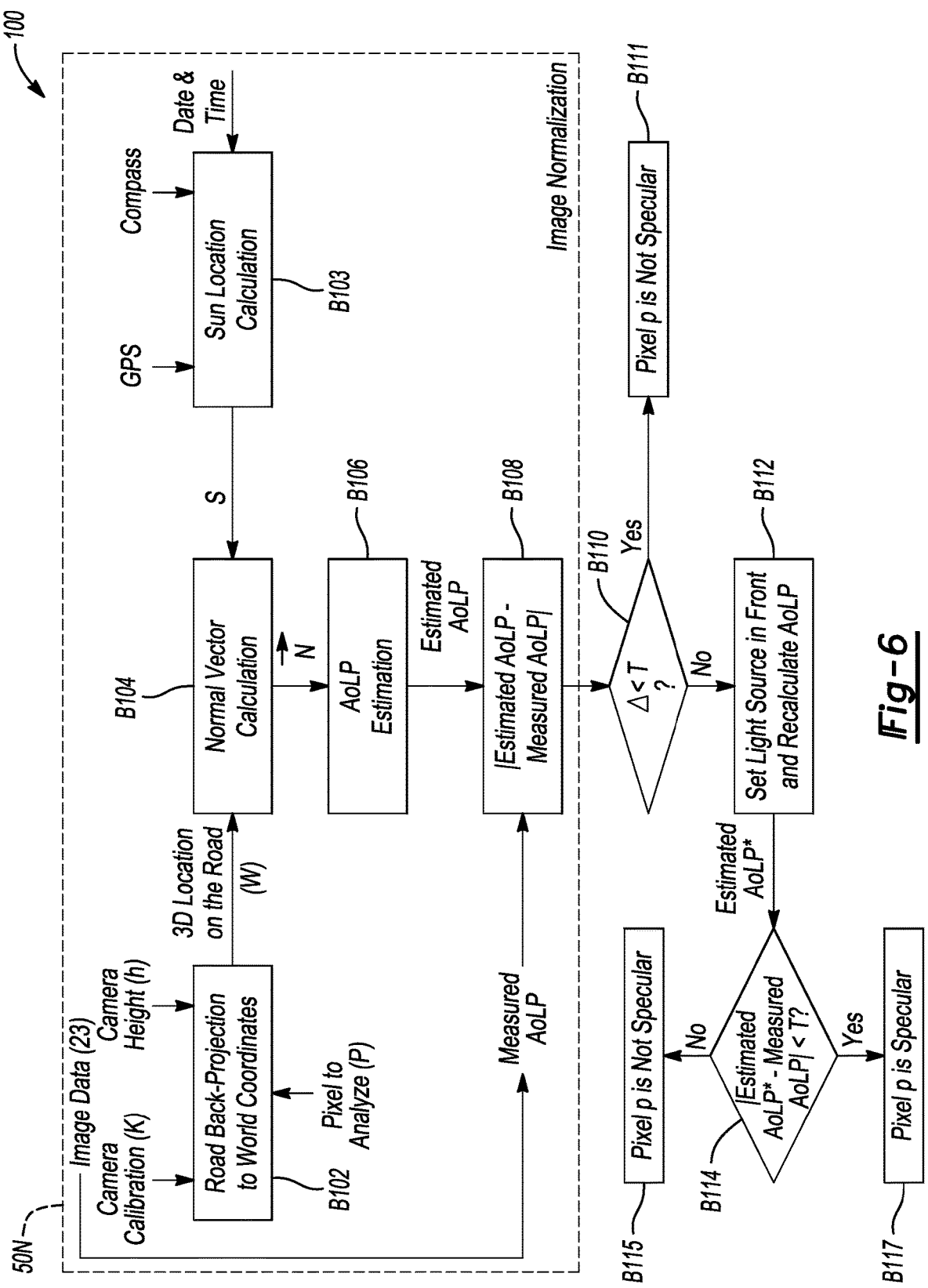
FIG. 6 is flow chart describing a method for detecting specular reflecting road areas using a polarimetric camera in accordance with the disclosure.

Referring now to FIG. 6, the method 100 of the present disclosure is shown in simplified form as being organized into discrete logic blocks. Each logic block in turn represents a particular step, function, or subprocess that is to be performed via the ECU 50 of FIGS. 1 and 2 when executing the present method 100. Blocks B102-B108 may be implemented as part of the above-noted normalization logic 50N. The ECU 50 will initiate the method 100 and normalization logic 50N upon startup or drive cycle initiation of the motor vehicle 10, such as by turning on or establishing connections with the camera 20, the GPS receiver 55, and the compass 17 of FIG. 2. The method 100 proceeds to block B102 when these actions have been completed.

Block B102 ("Road Back-Projection to World Coordinates") includes receiving a set of camera calibration data (K) for the camera 20. As appreciated in the art, camera calibration involves the determination of relevant parameters or coefficients needed for ascertaining the relationship between a point in 3D space in the imaged drive scene 230 of FIG. 4, and the corresponding 2D pixel projection in the collected polarimetric image data 23. As such, the calibration data (K) used in block B102 includes extrinsic and intrinsic parameters.

With respect to camera calibration parameters in general, extrinsic parameters typically include at least camera rotation and translation, and represent a transformation of 3D coordinates in the "real world" of the imaged drive scene, i.e., the Cartesian x, y, z coordinates of a point in the drive environs, to a corresponding 3D coordinate space of the camera 20. Intrinsic parameters for their part include focal length, the optical center/principal point, and the skew coefficient, are used to project the 3D space of the camera 20 into 2D image coordinates.

In addition to extrinsic and intrinsic parameters, block B102 also includes receiving the camera height (h) above the surface 11 as shown in FIG. 3, which is likewise prerecorded in memory 54 of the ECU 50 and accessible thereby. The ECU 50 thereafter outputs the corresponding 3D coordinates of the point (W) of each image pixel on the drivable road surface 11 of FIGS. 1 and 3, with this action occurring as an electronic signal. The method 100 thereafter proceeds to block B103.

Block B103 ("Sun Location Calculation") entails receiving the GPS signals 130 via the GPS receiver 55, including a time-and-date stamped location 550DT of the motor vehicle 10, and also receives the current heading 170 of the motor vehicle 10 from the compass 17. Using this information, the ECU 50 estimates the present location of the Sun 15 relative the motor vehicle 10 of FIG. 1 as an estimated Sun location S. The estimated Sun location S is thereafter communicated to block B104, to which the method 100 thereafter proceeds.

At block B104 ("Normal Vector Calculation"), the ECU 50 calculates the surface normal ($\vec{N}$) of FIG. 3 for each constituent image pixel of the road surface 11 of FIG. 1. This calculation is performed using the estimated Sun location (S) from block B103 and the corresponding 3D location (W) of each image pixel on the drivable road surface 11 from block B102. The surface normal ($\vec{N}$), at a macroscopic resolution, lies in the plane defined by three points: (1) the Sun location (S), the location (C) of the camera 20, and the point (W) corresponding to a pixel of interest in the imaged drive scene of FIG. 3. The surface normal ($\vec{N}$) is the vector bisecting the $\overline{SW}$ and $\overline{CW}$ rays in this arrangement. The method 100 then proceeds to block B106.

Block B106 ("AoLP Estimation") includes receiving the estimated normal ($\vec{N}$) from block B104 as described above. Using the estimated normal ($\vec{N}$) information, the ECU 50 estimates the AoLP. As understood in the art, AoLP is calculatable from polarization physics. For instance, with AoLP ($\phi$), this value may be calculated by the ECU 50 from the azimuth angle ($\alpha$) of the local normal ($\vec{N}$) as follows:

$$\phi = \alpha - \frac{\pi}{2}$$

The method 100 thereafter proceeds to block B108.

At block B108 ("| Estimated AoLP–Measured AoLP|"), the ECU 50 of FIGS. 1 and 2 receives a measured AoLP as part of the polarimetric image data 23, i.e., an actual AoLP, along with the estimated AoLP value from block B106. Block B108 thus entails calculating a "delta value" ($\Delta$) as the absolute value of the difference between the measured and estimated AoLPs, i.e.:

$$\Delta = |\text{measured } AoLP(x, y) - \text{estimated } AoLP(x, y)|.$$

If the estimated AoLP matches the measured AoLP, i.e., if $\Delta$ is a small value, then the Sun 15 is the dominant light source in the image scene, and the pixel falls on the road surface 11. However, if there is no fit, the ECU 50 analyzes the data further to ascertain the specular nature or world location of the pixel. The method 100 thereafter proceeds to block B110.

At block B110 ("Δ<T?") the ECU 50 compares the delta value (Δ) from block B108 to a predetermined threshold value ("T"). The threshold value used in block B110 may be a calibrated value below which the pixel (p) under consideration is deemed "not specular". The method 100 proceeds to block B111 when A is less than the threshold (T), i.e., when the pixel (p) is not specular, and to block B112 in the alternative.

At block B111 ("Pixel p is Not Specular"), the ECU 50 records the non-specular result for pixel (p) in its memory 54, e.g., as a corresponding bit code, with the method 100 thereafter proceeding with analysis of another pixel in the polarimetric image data 23.

Block B112 ("Set Light Source in Front and Recalculate AoLP") is arrived at when the delta value (Δ) from block B108 exceeds the predetermined threshold value indicative of a specular surface. If there is not a fit in block B108, and if moving the light source 150 of FIG. 5B in front of the camera 20 produces a good fit between the measured and estimated AoLP, i.e., the recalculated delta value is below the threshold (T) close to zero, then the pixel (p) lies on the road surface 11 and the Sun 15 is not the dominant light source. Thus, the specular surface's BRDF dominates, with FIG. 5B illustrating the virtual placement of the dominant light source 150 in direct line with the camera 20. The ECU 50 then recalculates the estimated AoLP and proceeds to block B114.

Block B114 ("| Estimated AoLP*−measured AoLP|<T?") entails comparing the newly estimated AoLP from block B112, as indicated by the "*", to the threshold (T) from block B110. If moving the dominant light source 150 to the position P2 shown in FIG. 5B does not resolve the specular-non-specular identity of the pixel (p), i.e., the newly calculated delta value/difference is not close to zero/is larger than T, then the earlier assumed geometry of the road surface 11 is incorrect, and the pixel (p) is deemed not to be a specular object or surface on the road surface 11.

The ECU 50 therefore records one of two results in respective blocks B115 ("Pixel p is Not Specular") and B117 ("Pixel p is Specular") after executing block B114: (1) the pixel (p) under consideration is either not specular or not on the road surface 11, which results when the recalculated delta value Δ* exceeds the threshold T, or (2) that the pixel (p) is located on the road surface 11 and is specular. The ECU 50 may use the results to perform a suitable control action aboard the motor vehicle 10 of FIG. 1. However, the particular result in which the pixel (p) is specular and on the road surface 11 could be used by the ECU 50 and/or the PPM 62 (FIG. 2) to optimize performance of an onboard perception function.

The above-disclosed ECU 50 and method 100 are therefore configured to detect specular reflecting areas on the road surface 11 of FIG. 1. Knowledge of such areas may be useful in a myriad of applications, including but not limited to informing drive control actions in proximity to crosswalks or schools. Similarly, the specular reflecting areas could be further investigated to determine the particular composition, such as paint, water, ice, or oil, and to execute autonomous braking, steering, or other actions. Use of the location (S) of the Sun 15 shown in FIG. 3 effectively disentangles information about the materials of the road surface 11 and geometry of the imaged drive scene 230, and thus allows the ECU 50 to detect highly specular reflecting areas on the road surface 11. Collectively, the availability of the polarimetric image data 23, the location (S) of the Sun 15, and the performance of the normalization logic 50N as described allow the ECU 50 to ascertain details about the imaged drive scene 230 (FIGS. 4-5B) that are not otherwise made available in existing vehicle perception systems. These and other potential benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A detection system for a host vehicle, comprising:
   a polarimetric camera configured to collect polarized image data, the polarized image data forming an imaged drive scene inclusive of a road surface illuminated by the Sun;
   a global positioning system ("GPS") receiver operable for outputting a present location of the host vehicle as a date and time-stamped coordinate set;
   a compass configured to provide a directional heading of the host vehicle; and
   an electronic control unit ("ECU") in communication with the camera, the GPS receiver, and the compass, wherein the ECU is configured to:
      determine a location of the Sun relative to the host vehicle and the camera using an input data set, the input data set including the present location of the host vehicle and the directional heading of the host vehicle from the GPS receiver and the compass, respectively;
      detect a specular reflecting area on the road surface within the imaged drive scene using the polarized image data and the location of the Sun, wherein the specular reflecting area forms an output data set, and wherein the ECU is configured to detect the specular reflecting area by:
         detecting that an image pixel in the polarized image data is not specular if a delta value is small, the delta value being an absolute value of a difference between an estimated angle of linear polarization (AoLP) and a measured AoLP;
         selectively applying a light reflecting and scattering model that assumes a dominant light source is located along a straight line extending in front of the host vehicle;
         recalculating the delta value as a recalculated delta value using the light reflecting and scattering mode; and
         confirming that the image pixel corresponds to the specular reflecting area when the recalculated delta value is close to zero; and
      execute a control action aboard the host vehicle in response to the output data set.

2. The system of claim 1, wherein the ECU is configured to:
   measure the measured AoLP using the polarimetric camera;
   estimate the estimated AoLP using the location of the Sun and the 3D location of the imaged pixel, assuming that the imaged pixel visualizes the road surface;

calculate the delta value as an absolute value of a difference between the estimated AoLP and the measured AoLP; and detect the specular reflecting area using the delta value.

3. The system of claim 1, wherein the host vehicle is a motor vehicle having a vehicle body, and wherein the polarimetric camera is connected to the vehicle body.

4. The system of claim 3, wherein the polarimetric camera is a color-polarimetric camera.

5. The system of claim 3, wherein the polarimetric camera is a monochromatic-polarimetric camera.

6. The system of claim 1, wherein the ECU is in communication with a path planning control module of the host vehicle, and is configured to provide the output data set to the path planning control module as at least part of the control action.

7. The system of claim 1, wherein the ECU is in communication with a display screen or a heads-up display ("HUD"), and configured to display a graphical representation of the imaged drive scene on the display screen and/or the HUD as at least part of the control action.

8. A method for use with a detection system aboard a host vehicle, comprising:
  receiving, via an electronic control unit ("ECU") of the host vehicle, an input data set from a global positioning system ("GPS") receiver and a compass of the host vehicle, the input set including a present location of the host vehicle and a directional heading of the host vehicle from the GPS receiver and the compass, respectively;
  receiving polarized image data from a polarimetric camera, wherein the polarized image data forms an imaged drive scene inclusive of a road surface illuminated by the Sun, and wherein the present location of the host vehicle includes a date-and-time-stamped coordinate set;
  determining a location of the Sun relative to the host vehicle and the polarimetric camera using the input data set;
  detecting a specular reflecting area on the road surface within the imaged drive scene using the polarized image data and the location of the Sun, via the ECU, wherein the specular reflecting area forms an output data set, wherein detecting the specular reflecting area includes:
    detecting that an image pixel is not specular if a delta value is small, the delta value being an absolute value of a difference between an estimated angle of linear polarization (AoLP) and measured AoLP;
    selectively applying a light reflecting and scattering model that assumes a dominant light source is located along a straight line extending in front of the host vehicle;
    recalculating the delta value as a recalculated delta value using the light reflecting and scattering mode; and
    confirming that the image pixel corresponds to the specular reflecting area when the recalculated delta value is close to zero; and
  executing a control action aboard the host vehicle via the ECU in response to the output data set.

9. The method of claim 8, comprising:
  measuring the measured AoLP via the ECU using the polarimetric camera;
  estimating the estimated AoLP using the location of the Sun and the 3D location of the imaged pixel assuming that the imaged pixel visualizes the road surface;
  calculating a delta value as an absolute value of a difference between the estimated AoLP and the measured AoLP; and
  detecting the specular reflecting area via the ECU using the delta value.

10. The method of claim 8, wherein the host vehicle is a motor vehicle having a vehicle body, the polarimetric camera is a body-mounted camera that is connected to the vehicle body, and receiving the input set includes receiving the polarized image data from the body-mounted camera over a vehicle communication network.

11. The method of claim 10, wherein receiving the polarimetric image data from the body-mounted camera includes receiving red-green-blue ("RGB")-polarimetric image data from the body-mounted camera.

12. The method of claim 10, further comprising:
  communicating the output data set to a path planning control module of the host vehicle as at least part of the control action.

13. The method of claim 10, further comprising:
  displaying a graphical representation of the imaged drive scene on a display screen and/or a heads-up display of the host vehicle as at least part of the control action.

14. The method of claim 10, wherein receiving the polarized image data from the body-mounted camera includes receiving monochromatic-polarimetric image data from the body-mounted camera.

15. A host vehicle, comprising:
  a vehicle body;
  road wheels connected to the vehicle body; and
  a detection system including:
    a polarimetric camera configured to collect polarized image data, the polarized image data forming an imaged drive scene inclusive of a road surface illuminated by the Sun;
    a global positioning system ("GPS") receiver operable for outputting a present location of the host vehicle as a date and time-stamped coordinate set;
    a compass configured to provide a directional heading of the host vehicle; and
    an electronic control unit ("ECU") in communication with the polarimetric camera, the GPS receiver, and the compass, wherein the ECU is configured to:
      determine a location of the Sun relative to the host vehicle and the polarimetric camera using an input data set, the input data set including the present location and the directional heading from the GPS receiver and the compass, respectively;
      detect a specular reflecting area on the road surface within the imaged drive scene using the polarized image data and the location of the Sun, wherein the specular reflecting area forms an output data set, wherein the ECU is configured to detect the specular reflecting area by:
        detecting that an image pixel in the polarized image data is not specular if a delta value is small, the delta value being an absolute value of a difference between an estimated angle of linear polarization (AoLP) and a measured AoLP;
        selectively applying a light reflecting and scattering model that assumes a dominant light source is located along a straight line extending in front of the host vehicle;
        recalculating the delta value as recalculated delta value using the light reflecting and scattering mode; and confirming that the image pixel corresponds to the specular reflecting area when the recalculated delta value is close to zero; and execute a control action aboard the host vehicle in response to the output data set.

16. The host vehicle of claim 15, wherein the ECU is configured to:
measure the measured AoLP using the polarimetric camera;
estimate the estimated AoLP using the location of the Sun and the 3D location of the image pixel assuming that the image pixel visualizes the road surface;
calculate the delta value as a difference between the estimated AoLP and the measured AoLP; and
detect the specular reflecting area using the delta value.

17. The host vehicle of claim 15, wherein the polarimetric camera includes a color-polarimetric camera.

18. The host vehicle of claim 15, further comprising:
a path planning control module, wherein the ECU is configured to communicate the output data set to the path planning control module as at least part of the control action.

19. The host vehicle of claim 15, further comprising:
at least one of a display screen or a heads-up display ("HUD") configured to display a graphical representation of the imaged drive scene, wherein the control action includes transmitting a display control signal to the display screen and/or the HUD.

20. The host vehicle of claim 15, wherein the polarimetric camera includes a monochromatic-polarimetric camera.

* * * * *